(12) United States Patent
Donohoe et al.

(10) Patent No.: US 8,205,169 B1
(45) Date of Patent: Jun. 19, 2012

(54) MULTIPLE EDITOR USER INTERFACE

(75) Inventors: Brendan Donohoe, Berkeley, CA (US); Robert Jensen, Berkeley, CA (US); Oren Jacob, Piedmont, CA (US)

(73) Assignee: Pixar, Emeryville, CA (US)

( * ) Notice: Subject to any disclaimer, the term of this patent is extended or adjusted under 35 U.S.C. 154(b) by 953 days.

(21) Appl. No.: 12/136,157

(22) Filed: Jun. 10, 2008

(51) Int. Cl.
*G06F 3/048* (2006.01)
(52) U.S. Cl. ...................................................... 715/790
(58) Field of Classification Search .................. 715/766, 715/767, 783, 792, 794, 797, 790, 791, 795
See application file for complete search history.

(56) References Cited

U.S. PATENT DOCUMENTS

| | | | |
|---|---|---|---|
| 2003/0160815 A1* | 8/2003 | Muschetto | 345/733 |
| 2005/0108642 A1* | 5/2005 | Sinclair, II | 715/700 |

\* cited by examiner

*Primary Examiner* — Thanh Vu
(74) *Attorney, Agent, or Firm* — Patterson & Sheridan, LLP

(57) ABSTRACT

An application user interface includes multiple editors, each presenting a data view and controls for operating on data. The application user interface includes a windowed mode and a full-screen mode. The windowed mode displays multiple editors simultaneously, such as in separate windows or panes. The full-screen mode displays a primary editor that substantially covers the application display area. The full-screen mode displays the secondary editors as drawer user interface elements arranged along the edges of the application display area. Secondary editors are displayed and accessed as needed via these drawer user interface elements. The relative arrangement of editors is preserved when switching between windowed mode and full-screen mode. Users can customize the application user interface in either windowed mode or full-screen mode to add, remove, or change primary and secondary editors, with any changes in the application user interface being preserved when switching between windowed mode and full-screen mode.

27 Claims, 16 Drawing Sheets

MULTIPLE EDITOR USER INTERFACE

BACKGROUND

The present invention relates to the field of user interfaces for software applications, and in particular to methods and apparatus for displaying data and controls for manipulating data. Windowed operating systems allow many applications or documents to be on screen at the same time. While multiple windows are useful for multi-tasking and comparing information, displaying a large number of windows simultaneously, with their assorted toolbars, icons, menus, and other displays, can be distracting to users and reduce their efficiency. Additionally, displaying multiple windows simultaneously tends to reduce the amount of screen space available for performing any given task, which further reduces user efficiency.

To alleviate the visual clutter associated with the display of multiple windows simultaneously, some applications employ specially-designed full screen modes that feature a subset of the application's capabilities. These types of full-screen modes trade functionality for simplified modes of operations suited to only a few tasks, such as movie playback or photo comparison. Other applications provide methods of quickly showing and hiding different controls while focusing on a single, full-screen view of the data. However, these applications do not allow users to quickly access any given application control or function. Moreover, these applications do not allow users to quickly change the view of the data, or to quickly view different data sets simultaneously, unlike multiple window user interfaces. Furthermore, many application full-screen modes cannot be easily configured to display specific controls or application functions. Typically, users must manually configure the controls and data views of a full-screen mode in advance.

Therefore, there is an unmet need for an application user interface that combines the advantages of multiple window and full-screen user interfaces to allow users to efficiently multitask as well as focus on specific tasks without distractions from extraneous windows and controls. There is also an unmet need for an application user interface that enables users to quickly access different types of application controls and functions and to easily change between different tasks. There is also an unmet need for an application user interface to be easily and intuitively customized according to user preferences at any time during execution.

BRIEF SUMMARY

An application or applications include multiple editors. Each editor presents a distinct view of data and may include controls for operating on the data. Embodiments of the invention include an application user interface with two modes: a windowed mode and a full-screen mode. The windowed mode of the application user interface displays multiple editors simultaneously on a separate portions of the display device, such as in separate windows or panes. The full-screen mode of the application user interface displays a single primary editor that substantially covers the entire application display area. Users may switch freely between these two display modes at any time.

In an embodiment, when switching from the windowed mode to the full-screen mode, the editors that are not selected to be the primary editor, referred to as secondary editors, are converted into drawer user interface elements and arranged along the edges of the application display area in the full-screen mode. Secondary editors can be displayed and accessed as needed in the full-screen mode via these drawer user interface elements. Furthermore, a user can change any of the secondary editors into the primary editor without leaving the full-screen mode.

In an embodiment, the relative arrangement of editors with respect to each other is preserved when switching between windowed mode and full-screen mode. In an embodiment, users can customize the application user interface in either windowed mode or full-screen mode to add, remove, or change primary and secondary editors, with any changes in the application user interface being preserved when switching between windowed mode and full-screen mode.

BRIEF DESCRIPTION OF THE DRAWINGS

The invention will be described with reference to the drawings, in which.

DETAILED DESCRIPTION

Figure 1:
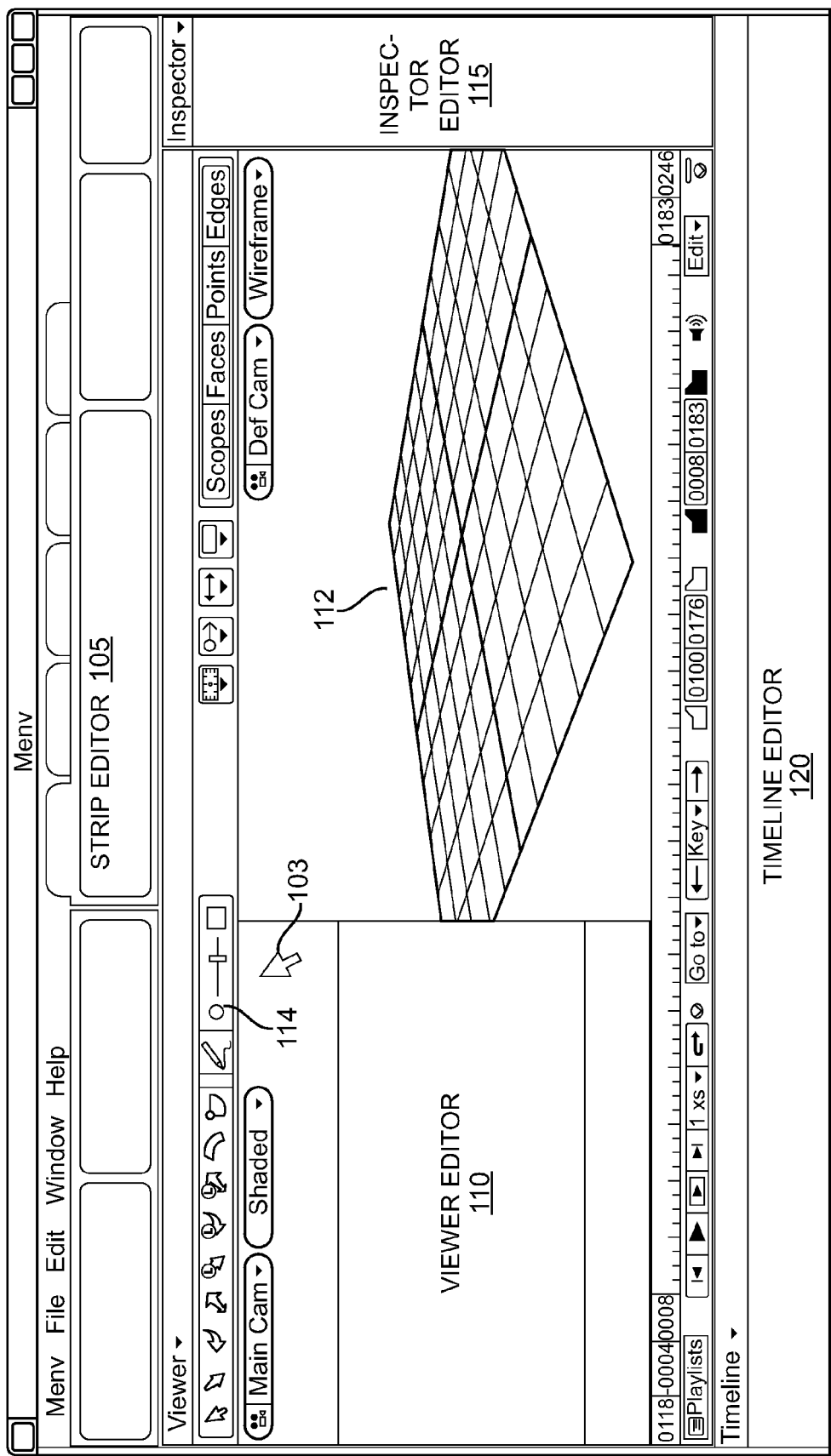
FIG. 1 illustrates an example windowed mode of an application user interface according to an embodiment of the invention.

An application or applications display one or more views of data and provide functions or controls for operating on this data. Each distinct view of data is referred to herein as an editor. Each editor may include a set of controls for performing operations on the data. The types of operations and controls provided by an application can vary depending upon the type of data and the purpose of the application. In general, applications can perform any type of operation that creates, augments, deletes, copies, or otherwise modifies data. Some or all of the controls associated with an editor may be displayed to users and activated using any type of user interface mechanism known in the art, including graphical menus, buttons, icons, toolbars, palettes, command or hot keys, and any combinations thereof. The view of data and the operations and controls provided by an editor are often, though not always, unique to that editor.

Embodiments of the invention include an application user interface with two modes: a windowed mode and a full-screen mode. Following the initialization of the application user interface, the windowed mode of the application user interface displays multiple editors simultaneously. Each editor is displayed on a separate portion of the display device. For example, each editor can be displayed in a separate window on a display device. In another example, a single application window is split into "panes," with editors being displayed in a different pane. To improve clarity and increase the screen size of some of the editors, an application may assign two or more of the other editors to a single window or pane, with only one of the editors associated with a pane visible at any time, User interface mechanisms, such as tab panels, button, and menus, may be used to select which of the multiple editors associated with a single pane is to be displayed.

The full-screen mode of an application user interface covers substantially the entire application display area, such as the application window or the entire screen display, with a single editor. The editor displayed in the full-screen mode is referred to as the primary editor. As discussed in detail below, when a user switches from windowed mode to full-screen mode, the user may select one of the editors from the windowed mode to be the primary editor in full-screen mode. Users may switch freely between these two display modes at any time.

In an embodiment, the other editors displayed in the windowed mode that are not selected to be the primary editor, referred to as secondary editors, are converted into drawer user interface elements and arranged along the edges of the application display area. Secondary editors can be displayed and accessed as needed in the full-screen mode via these drawer user interface elements, and automatically. Furthermore, a user can change any of the secondary editors into the primary editor without leaving the full-screen mode.

In an embodiment, the relative arrangement of editors with respect to each other is preserved when switching between windowed mode and full-screen mode. In an embodiment, users can customize the application user interface in either windowed mode or full-screen mode to add, remove, or change primary and secondary editors, with any changes in the application user interface being preserved when switching between windowed mode and full-screen mode.

FIG. 1 illustrates an example windowed mode 100 of an application user interface according to an embodiment of the invention. The windowed mode 100 of example application user interface displays multiple editors simultaneously, including a strip editor 105, a viewer editor 110, an inspector editor 115, and a timeline editor 120. Each of these editors can include a view of the data and/or a set of controls for manipulating data. For example, the viewer editor 110 includes a view 112 of three-dimensional object data and controls 114 for changing the camera position and rendering parameters associated with view 112. Users can interact with editors 105, 110, 115, and 120 and their associated controls using a mouse cursor 103, keyboard commands, and/or any other type of input.

Figure 2:
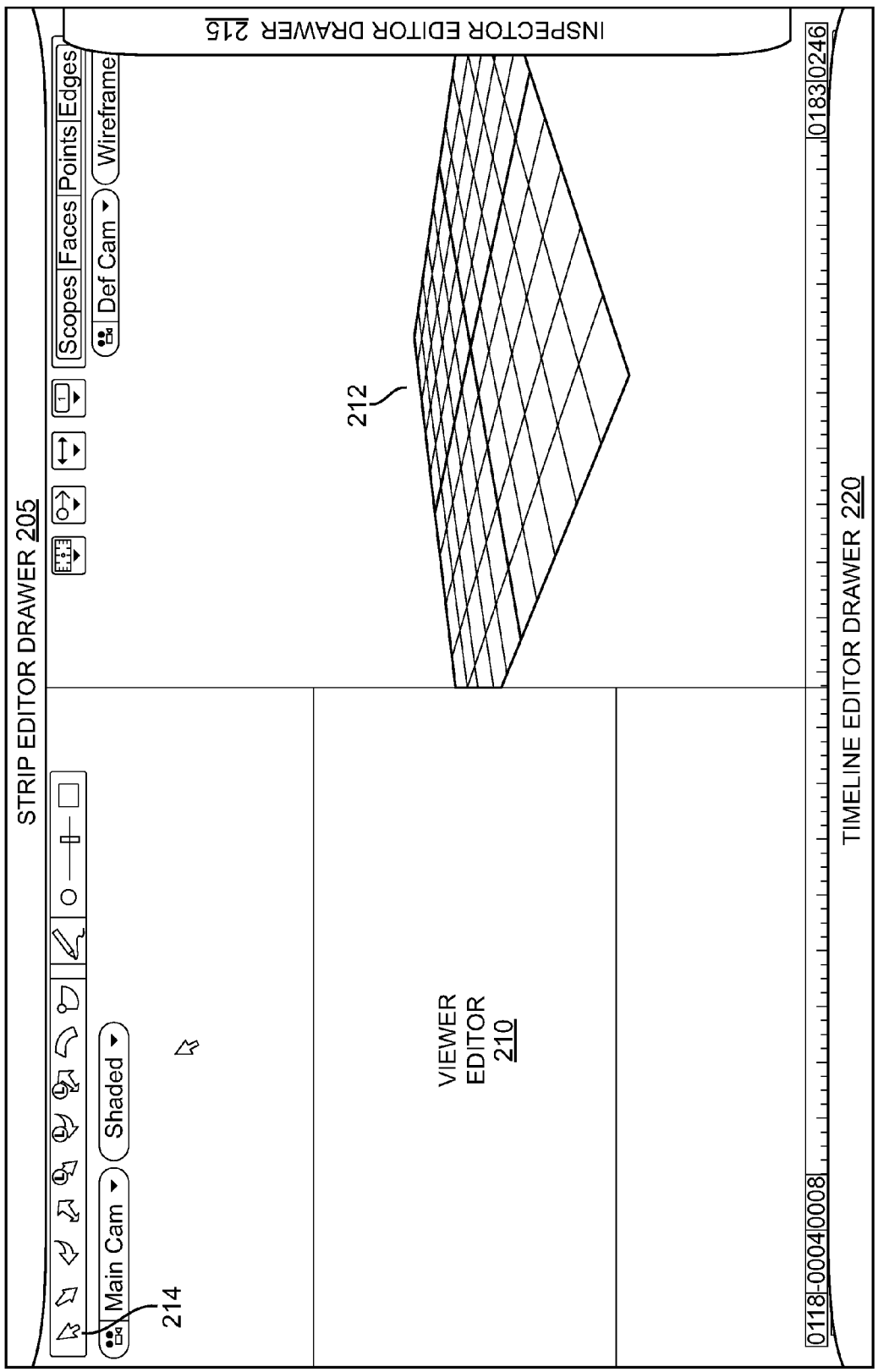
FIG. 2 illustrates an example full-screen mode of an application user interface according to an embodiment of the invention.

FIG. 2 illustrates an example full-screen mode 200 of an application user interface according to an embodiment of the invention. This example of the full-screen mode 200 corresponds with the windowed mode 100 shown in FIG. 1. Full-screen mode 200 includes a strip editor 205, a viewer editor 210, an inspector editor 215, and a timeline editor 220. In this example of the full-screen mode 200, the viewer editor 210 has been selected as the primary editor. Because it is the primary editor, the viewer editor 210 occupies the majority of the application display area. This allows users to focus on the viewer editor, its view of the data 212, and its controls 214 without distraction from the other editors. In an embodiment, the view of the data 212 and the controls 214 are the same as the view 112 and the controls 114 presented by the viewer editor 110 in the windowed mode. This presents a consistent interface to the user regardless of whether the application is in windowed mode or full-screen mode.

In addition to presenting the viewer editor 210 as the primary editor in full-screen mode, the application user interface also allows access to the secondary editors as needed via drawer user interface elements. In this example, the strip editor drawer 205, the inspector editor drawer 215, and the timeline editor drawer 220 allow access to the strip editor, inspector editor, and timeline editor as needed. FIG. 2 shows the secondary editor drawers 205, 215, and 220 in their default closed configurations. In its closed configuration, a drawer user interface element occupies a minimal amount of screen space along the edge of the application display area, with the associated editor's controls and data view hidden from view.

To assist users in accessing secondary editors, each drawer user interface element includes a label identifying its associated editor. In a further embodiment, the relative locations of the drawer user interface elements for the secondary editors in the full-screen mode 200 correspond with these editors' positions in the windowed mode 100. For example, the strip editor 105 is located at the top of the display area in the windowed mode of the application user interface. Thus, the strip editor drawer 205 is located along the top edge of the application display area in the full-screen mode 200. Similarly, the inspector editor drawer 215 is located along the right edge of the application display area and the timeline editor drawer 220 is located along the bottom edge of the application display area, reflecting the relative positions of the inspector editor 115 and the timeline editor 120 in the windowed mode 100.

Figure 3A:
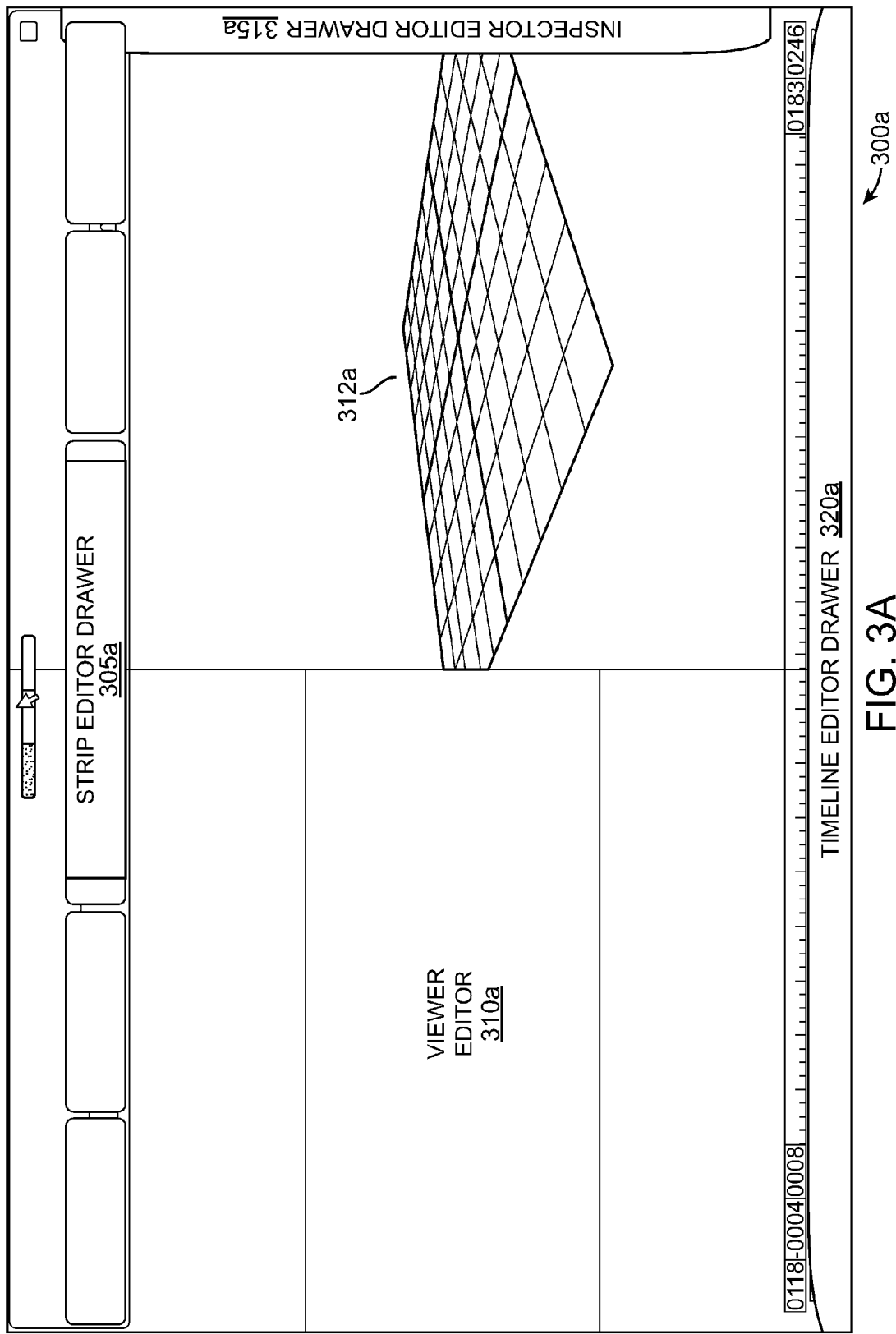
FIGS. 3A-3C illustrate the arrangement and operation of example drawers enabling access to additional application functions and controls in an application user interface according to an embodiment of the invention.
Figure 3B:
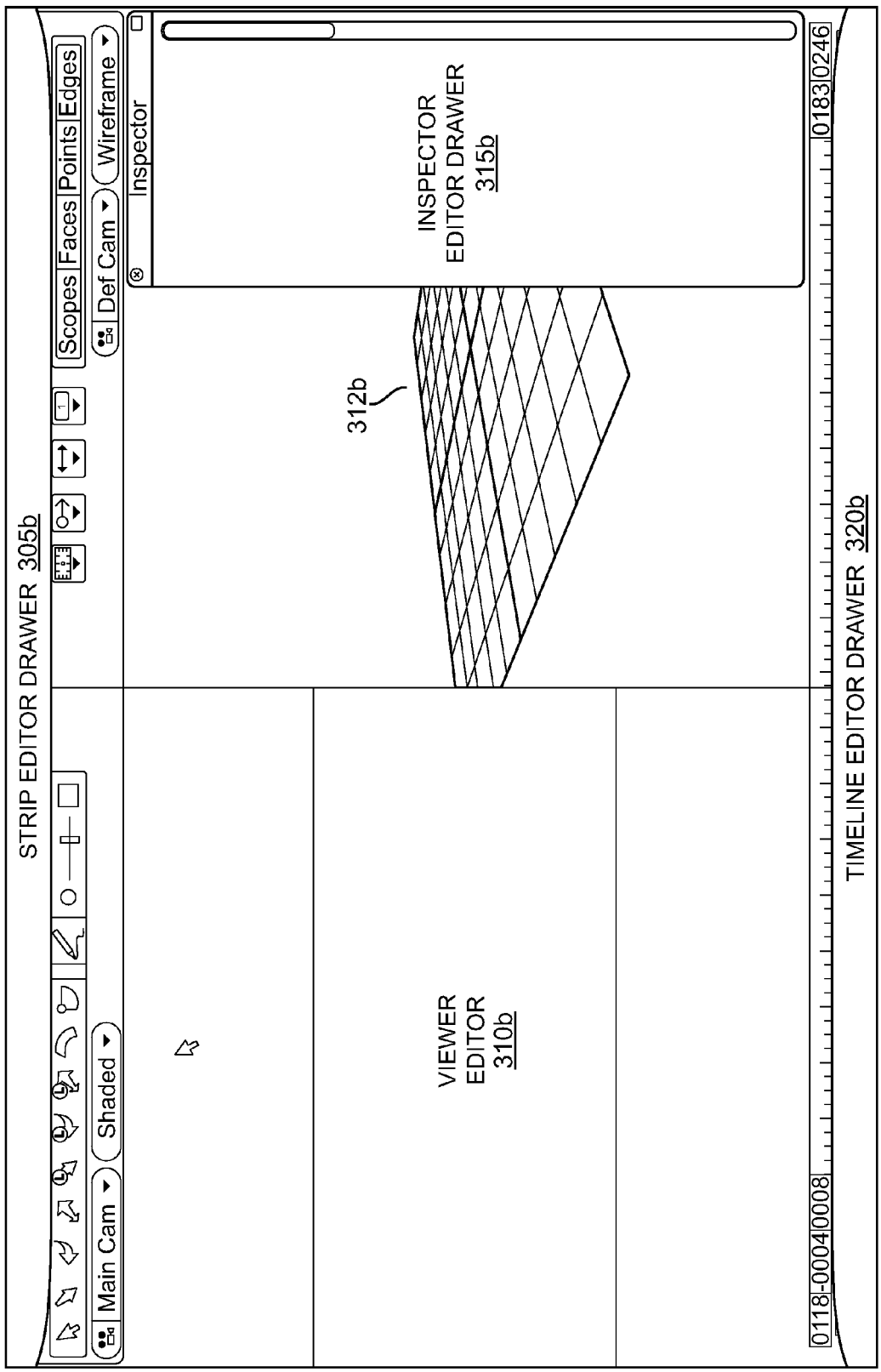
Figure 3C:
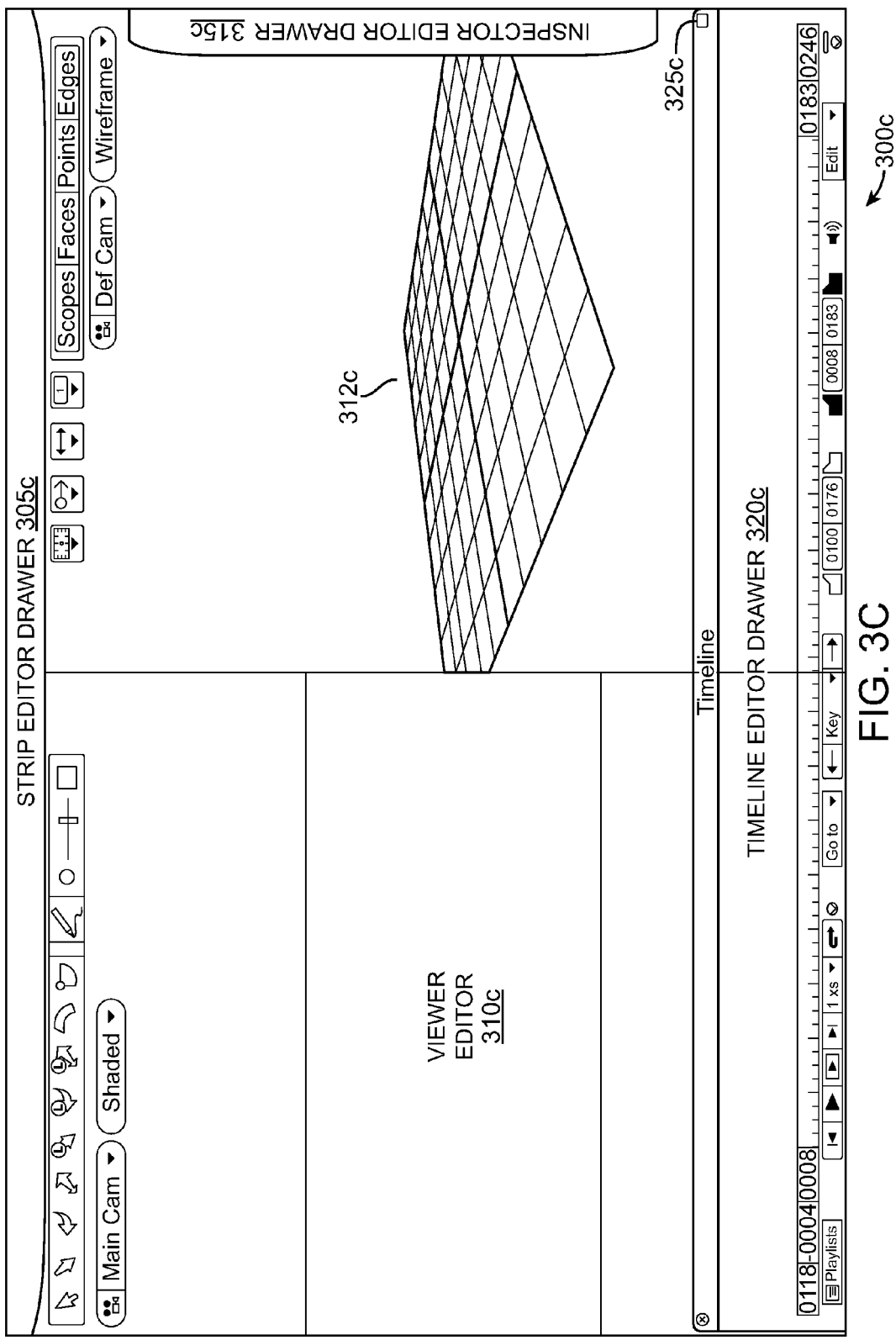

Although the default closed configuration of the drawer user interface elements 205, 215, and 220 hides the controls and data views of the secondary editors, users can access the controls and data views of the secondary editors by interacting the drawer user interface elements. FIGS. 3A-3C illustrate the arrangement and operation of example drawers enabling access to additional application functions and controls in an application user interface according to an embodiment of the invention.

FIG. 3A illustrates an example full-screen mode 300a of an application user interface with a drawer associated with a secondary editor activated. Example full-screen mode 300a includes a primary editor 310a showing a data view 312a and secondary editor drawers 305a, 315a, and 320a. The primary and secondary editors of example full-screen mode 300a correspond with those shown in example full-screen mode 200. In this example, a user has activated the strip editor drawer 305a. As a result, the strip editor drawer 305a changes from the closed configuration of 205 in FIG. 2 to the opened configuration 305a shown in FIG. 3A. The opened strip editor drawer 305a occupies a larger portion of the application screen area and includes at least a portion of the controls and data view presented by the strip editor 105 in the windowed mode 100 shown in FIG. 1.

Similarly, FIG. 3B illustrates an example full-screen mode 300b of an application user interface with a drawer associated with a secondary editor activated. Example full-screen mode 300b includes a primary editor 310b and secondary editor drawers 305b, 315b, and 320b, corresponding with those shown in example full-screen mode 200. In this example, a user has activated the inspector editor drawer 315b. As a result, the inspector editor drawer 315b changes from the closed configuration of 215 in FIG. 2 to the opened configuration 315b shown in FIG. 3B. The opened inspector editor drawer 315b occupies a larger portion of the application screen area and includes at least a portion of the controls and data view presented by the inspector editor 115 in the windowed mode 100 shown in FIG. 1.

FIG. 3C illustrates an example full-screen mode 300c of an application user interface with a drawer associated with a secondary editor activated. Example full-screen mode 300c includes a primary editor 310c and secondary editor drawers 305c, 315c, and 320c, corresponding with those shown in example full-screen mode 200. In this example, a user has activated the timeline editor drawer 320c. As a result, the timeline editor drawer 320c changes from the closed configuration of 220 in FIG. 2 to the opened configuration 320c shown in FIG. 3C. The opened timeline editor drawer 320c occupies a larger portion of the application screen area and includes at least a portion of the controls and data view presented by the timeline editor 120 in the windowed mode 100 shown in FIG. 1.

The drawer user interface elements may be activated by users in a number of different ways. In an embodiment, a user can move a cursor over a closed drawer user interface element to activate and open that drawer user interface element. Moving the cursor outside of the area occupied by the open drawer user interface element will deactivate the drawer user interface element and cause the drawer user interface element to return to its closed configuration. In an embodiment, drawer user interface elements have animated transitions between their open and closed configurations, such as an animation showing the drawer "sliding" between its closed and open configurations. Additionally, drawer user interface elements may be displayed with partial transparency, allowing users to view the portion of the primary editor window behind an open secondary editor drawer. In other embodiments, the drawer user interface elements can be activated using keyboard commands, mouse commands, and/or interactions with other graphical user interface elements, such as buttons or other controls.

In a further embodiment, a user may hold a drawer open by activating an additional user interface element, such as user interface element 325c. When user interface element 325c is activated, the timeline editor drawer 320c will remain in the open configuration regardless of the position of the cursor. Deactivating user interface element 325c will allow the timeline editor drawer 320c to return to its closed configuration.

In an embodiment, users can switch between a windowed mode, such as example windowed mode 100, and a full-screen mode, such as example full-screen mode 200, at any time. In an embodiment, transitions between these two modes are initiated using keyboard commands, mouse commands, and/or interactions with other graphical user interface elements, such as buttons or other controls. In further embodiments, transitions between the windowed mode and the full-screen mode may occur automatically based on the current context and functions of the application.

Figure 4:
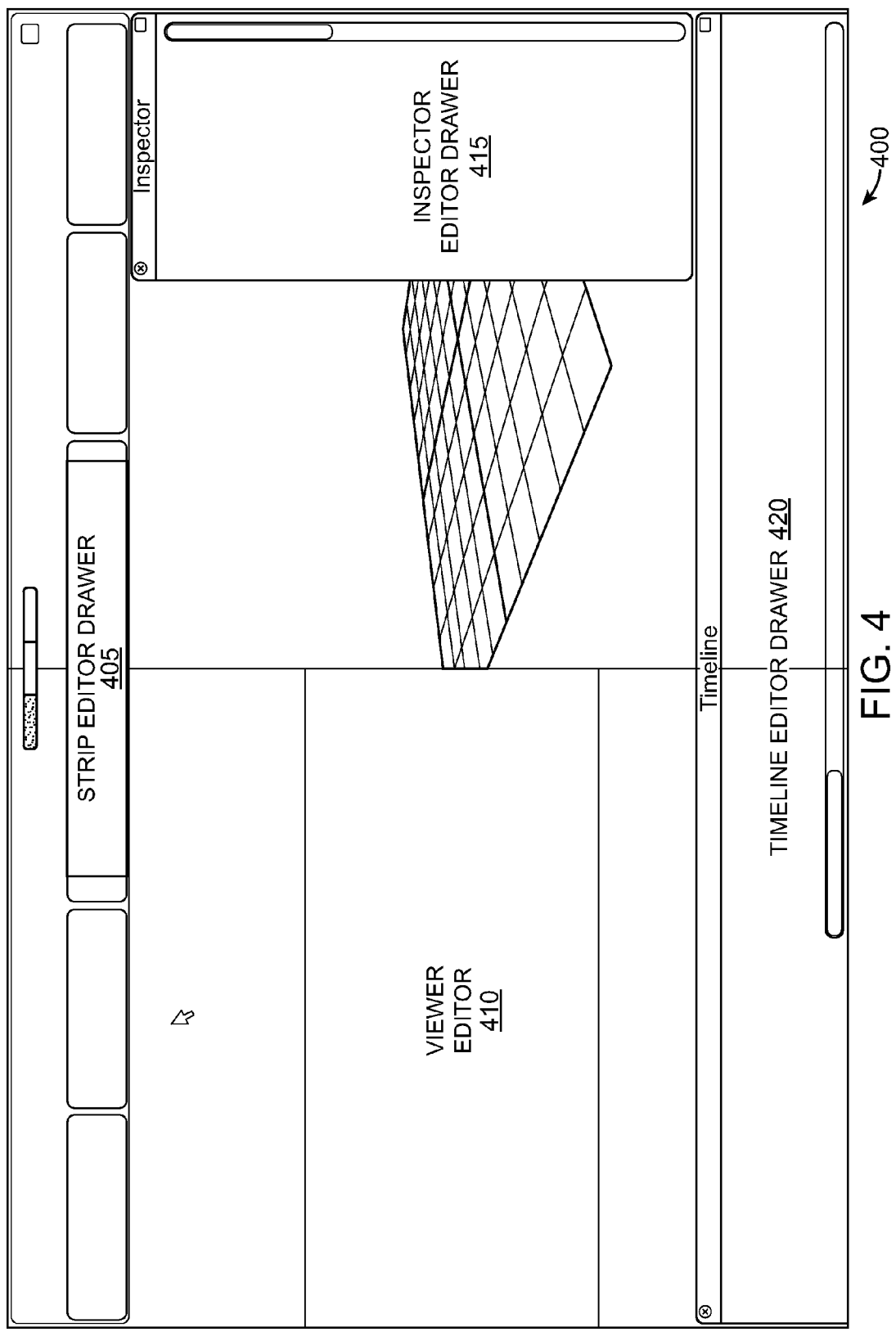
FIG. 4 illustrates an example transition between a windowed mode and a full-screen mode of an application user interface according to an embodiment of the invention.

In an embodiment, visual effects and animations can provide visual cues to user about the function and layout of secondary editors when switching between windowed and full-screen modes. FIG. 4 illustrates an example transition 400 between a windowed mode and a full-screen mode of an application user interface according to an embodiment of the invention.

Example transition 400 provides visual cues to the user when switching from a windowed mode to a full-screen mode. Upon receiving a command to initiate a transition from windowed mode to full-screen mode, this example transition 400 selects the currently active editor window in the windowed mode as the primary editor for the full-screen mode. Transition 400 then enlarges the selected primary editor to occupy all or most of the application display area, as shown by primary editor 410.

Additionally, transition 400 selects each of the inactive editor windows in the window mode as a secondary editor for the full-screen mode. Transition 400 then converts each of the secondary editor windows into drawer user interface elements, such as strip editor drawer 405, inspector editor drawer 415, and timeline editor drawer 420. In an embodiment, these drawer user interface elements are first displayed in their open configuration to provide visual cues to users of their functions. Transition 400 displays the drawers in their open configurations for a brief time period before changing to their closed configurations. In a further embodiment, transition 400 animates the secondary editor drawers 405, 415, and 420 changing to their closed configuration to provide visual cues to users about the arrangement of the secondary editors in the full-screen mode.

Figure 5A:
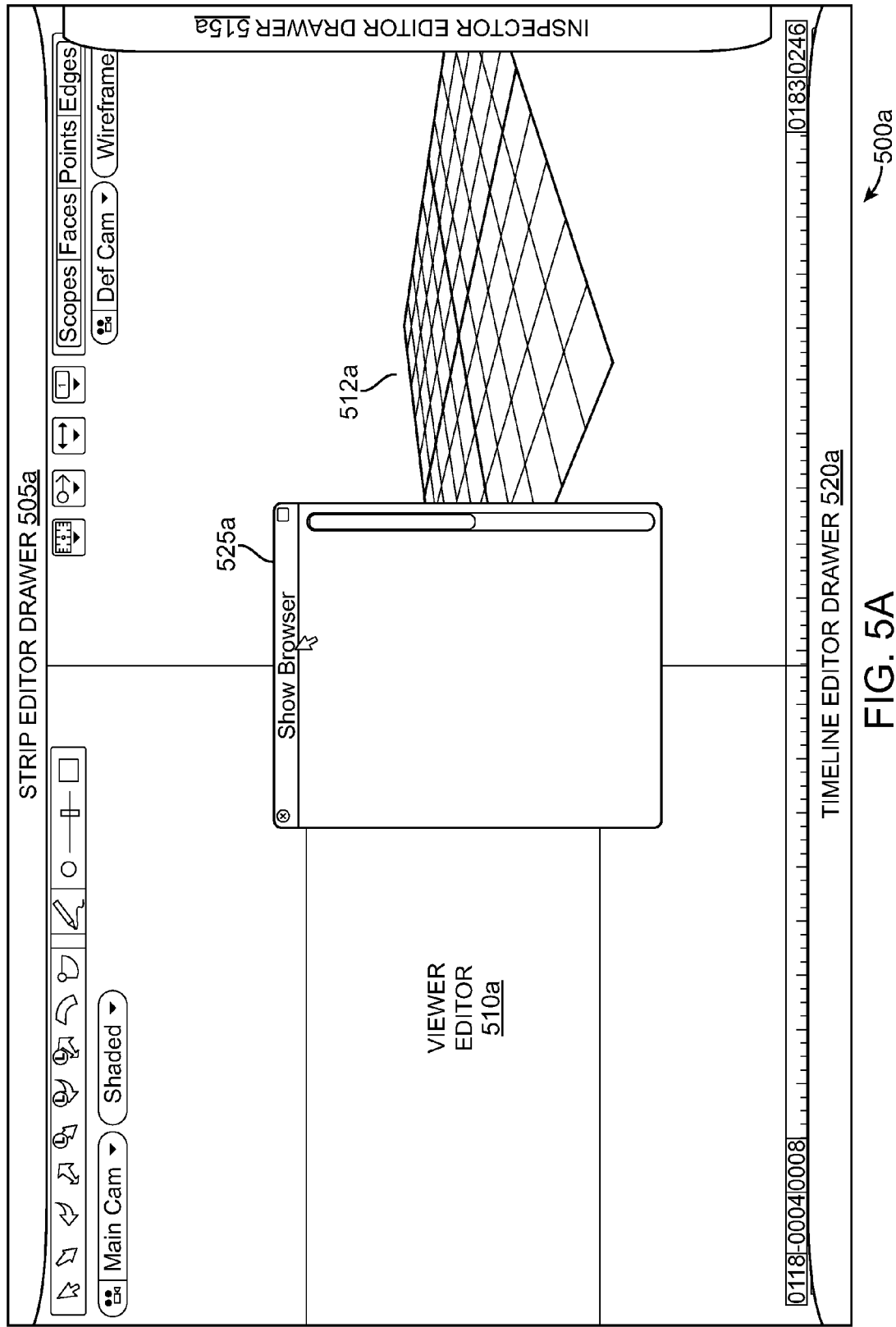
FIGS. 5A-5F illustrate examples of customizing an application user interface according to an embodiment of the invention.

In an embodiment, users can customize the type and arrangement of editors in the application user interface. FIGS. 5A-5F illustrate examples of customizing an application user interface according to an embodiment of the invention. FIG. 5A illustrates an example full-screen mode 500a of an application user interface. Example full-screen mode 500a includes a primary editor 510a showing a data view 512a and secondary editor drawers 505a, 515a, and 520a, similar to example 200 discussed above.

In this example, a user has added a show browser editor 525a to the application user interface. In an embodiment, users can add or remove editors using one or more keyboard commands, mouse or cursor inputs, or other types of user input. In this example, a newly added editor in the full-screen mode 500a is displayed as a free-floating window.

Figure 5B:
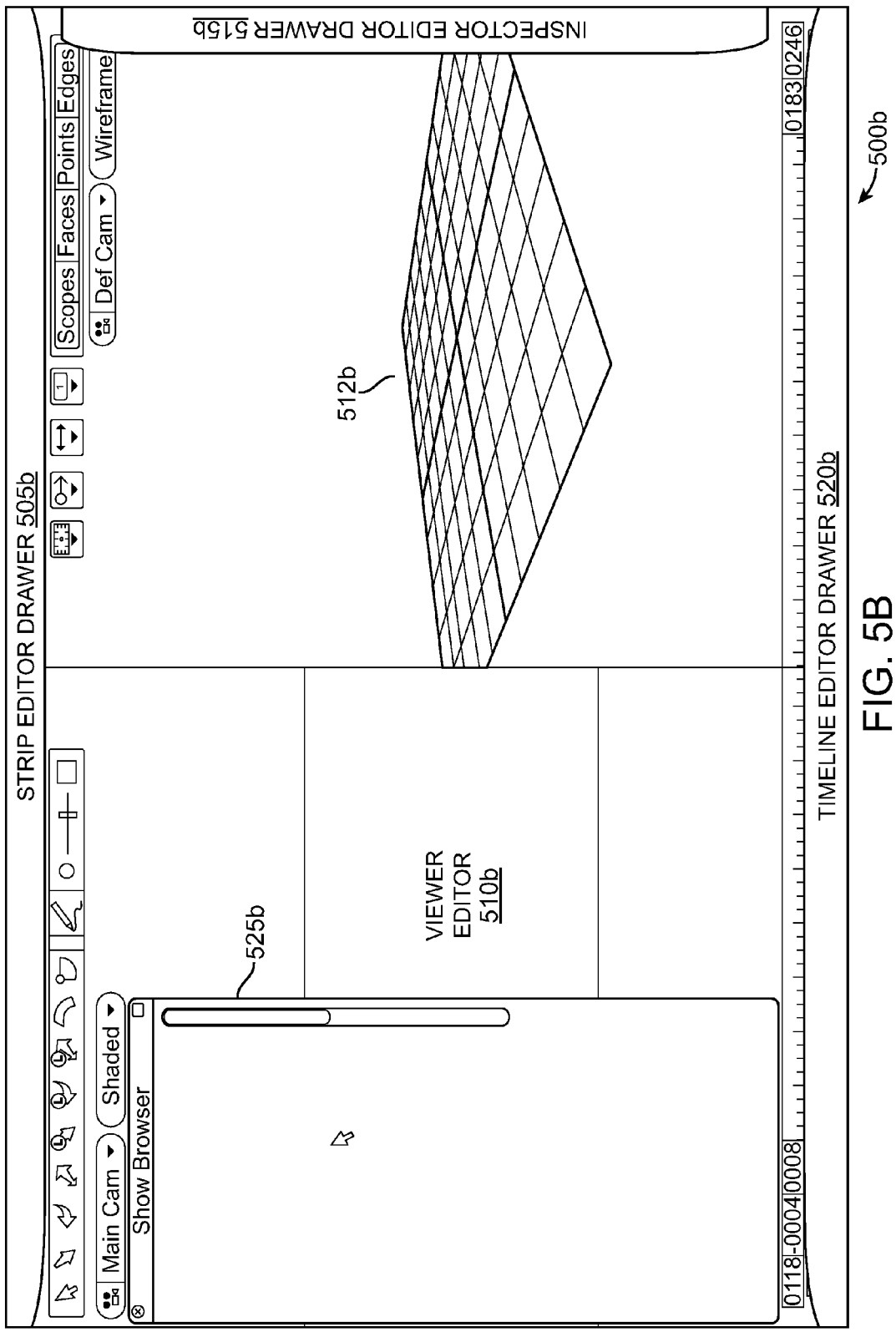

In an embodiment, a newly added editor can be converted into a secondary editor drawer. FIG. 5B illustrates an example full-screen mode 500b of an application user interface showing an additional editor being converted into a secondary editor drawer. Example full-screen mode 500b includes a primary editor 510b showing a data view 512b and secondary editor drawers 505b, 515b, and 520b, similar to example 500a discussed above.

In this example, the user has moves the show browser editor window to the left side of the application display area. Upon reaching the edge of the application display area, the show browser editor window is automatically converted into a show browser editor drawer 525b, similar to secondary editor drawers 505b, 515b, and 520b. The show browser editor drawer 525b is created, it is set to its open configuration. When the cursor leaves the area of show browser editor drawer 525b, it returns to a closed configuration, as shown by closed show browser editor drawer 525c in FIG. 5C.

Figure 5C:
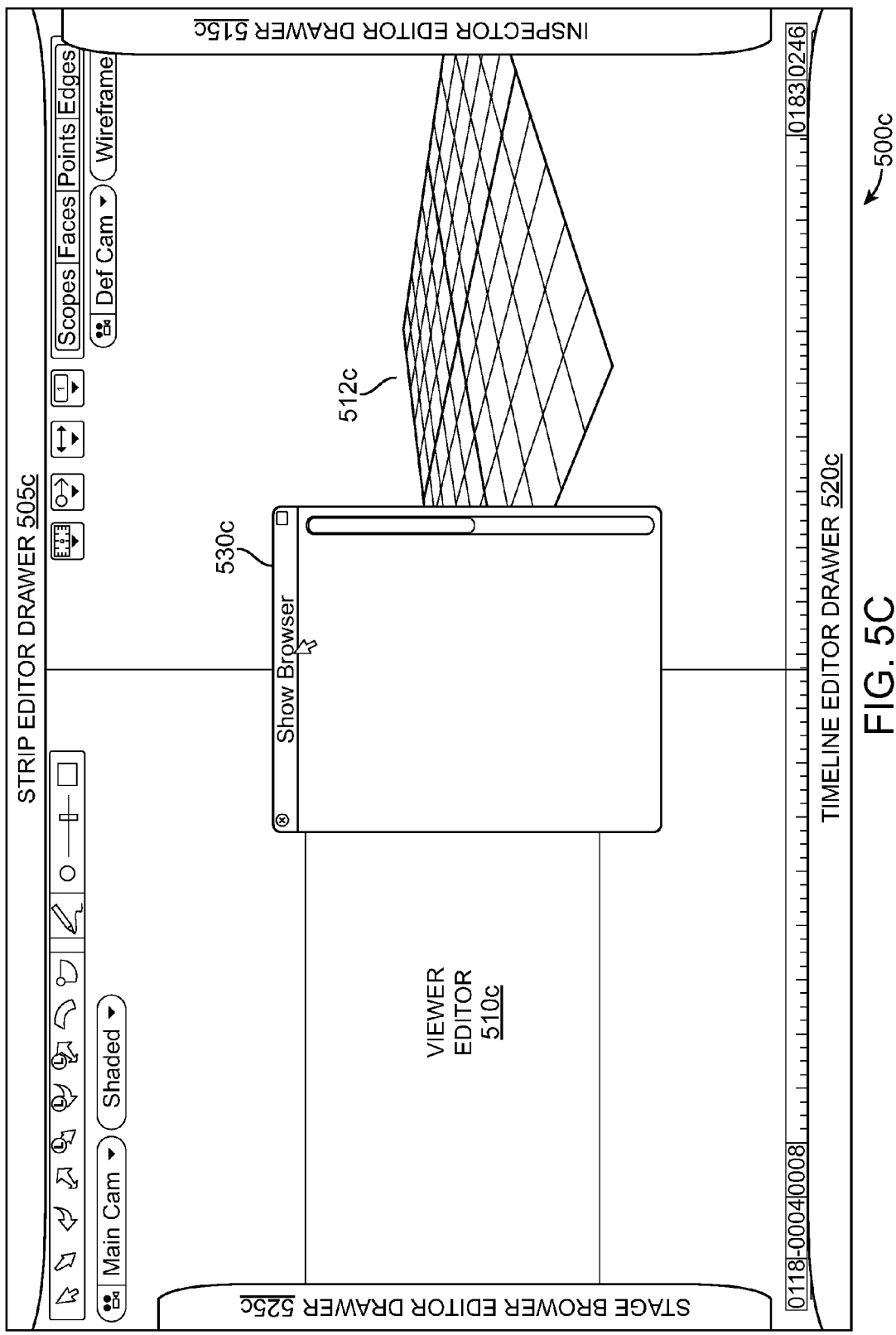

FIG. 5C illustrates an example full-screen mode 500c of an application user interface showing yet an additional editor being converted into a secondary editor drawer. Example full-screen mode 500c includes a primary editor 510c showing a data view 512c and secondary editor drawers 505c, 515c, 520c, similar to example 500a discussed above, as well as show browser editor drawer 525c added in the previous example. In example full-screen mode 500c, a user has added a stage browser editor 530c to the application user interface. As in the previous examples, the newly added stage browser 530c is displayed as a free-floating window in the full-screen mode 500c.

Figure 5D:
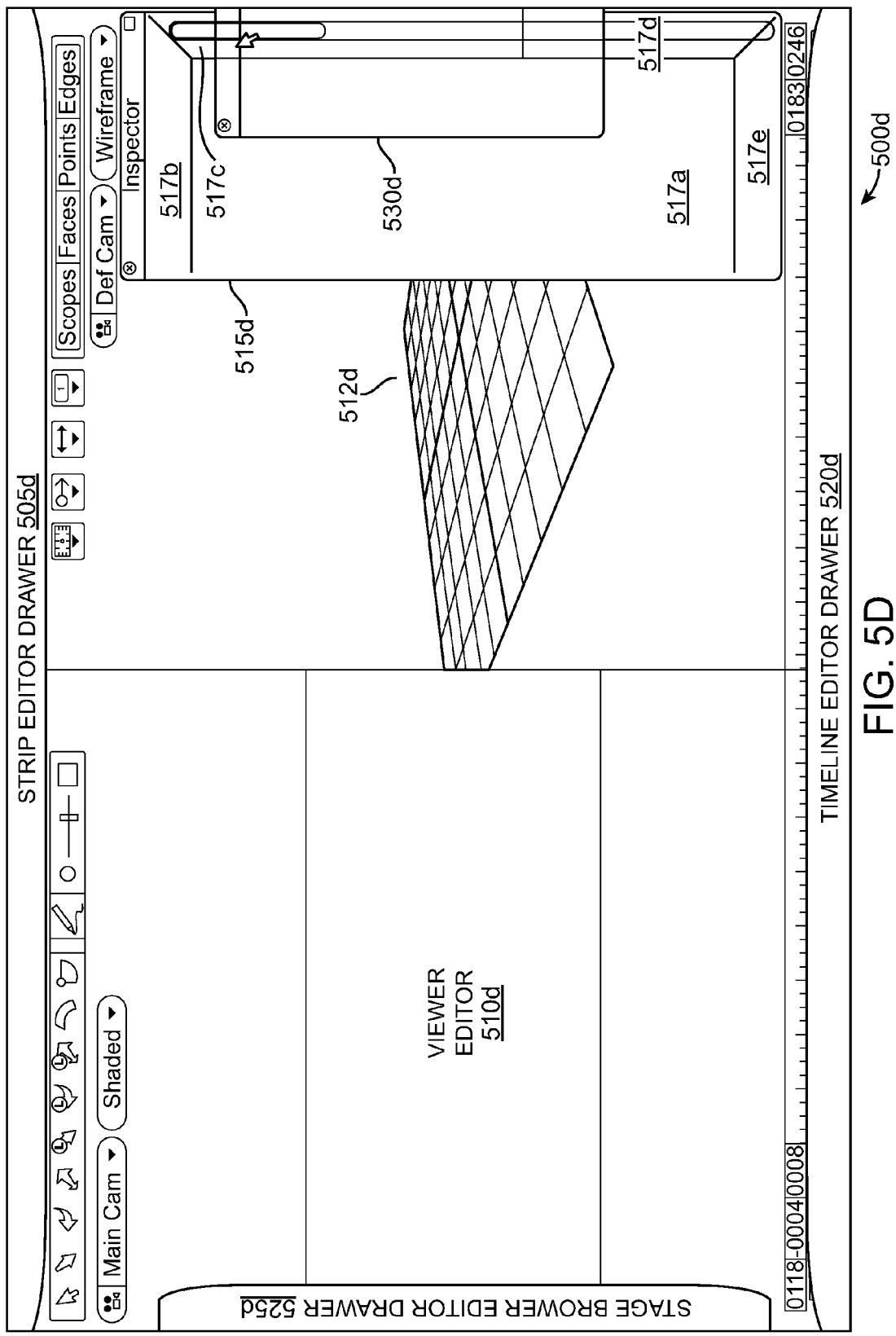

In a further embodiment, two or more editor drawers can be arranged on the same edge of the application display area. FIG. 5D illustrates an example full-screen mode 500d of an application user interface showing two secondary editor drawers arranged on the edge of the application display area. Example full-screen mode 500d includes a primary editor 510d showing a data view 512d and secondary editor drawers 505d, 515d, 520d, and 525d, similar to example 500c discussed above. The stage browser editor window 530d has been moved to the right side of the application display area.

As the stage browser window 530*d* reaches the right side of the application display area, the inspector editor drawer 515*d* already on this side changes to its open configuration, as shown in example 500*d*. However, because the user is moving an editor window to this side, the inspector editor drawer 515*d* displays a placement template 517, rather than the controls and data view associated with the inspector editor.

Figure 5E:
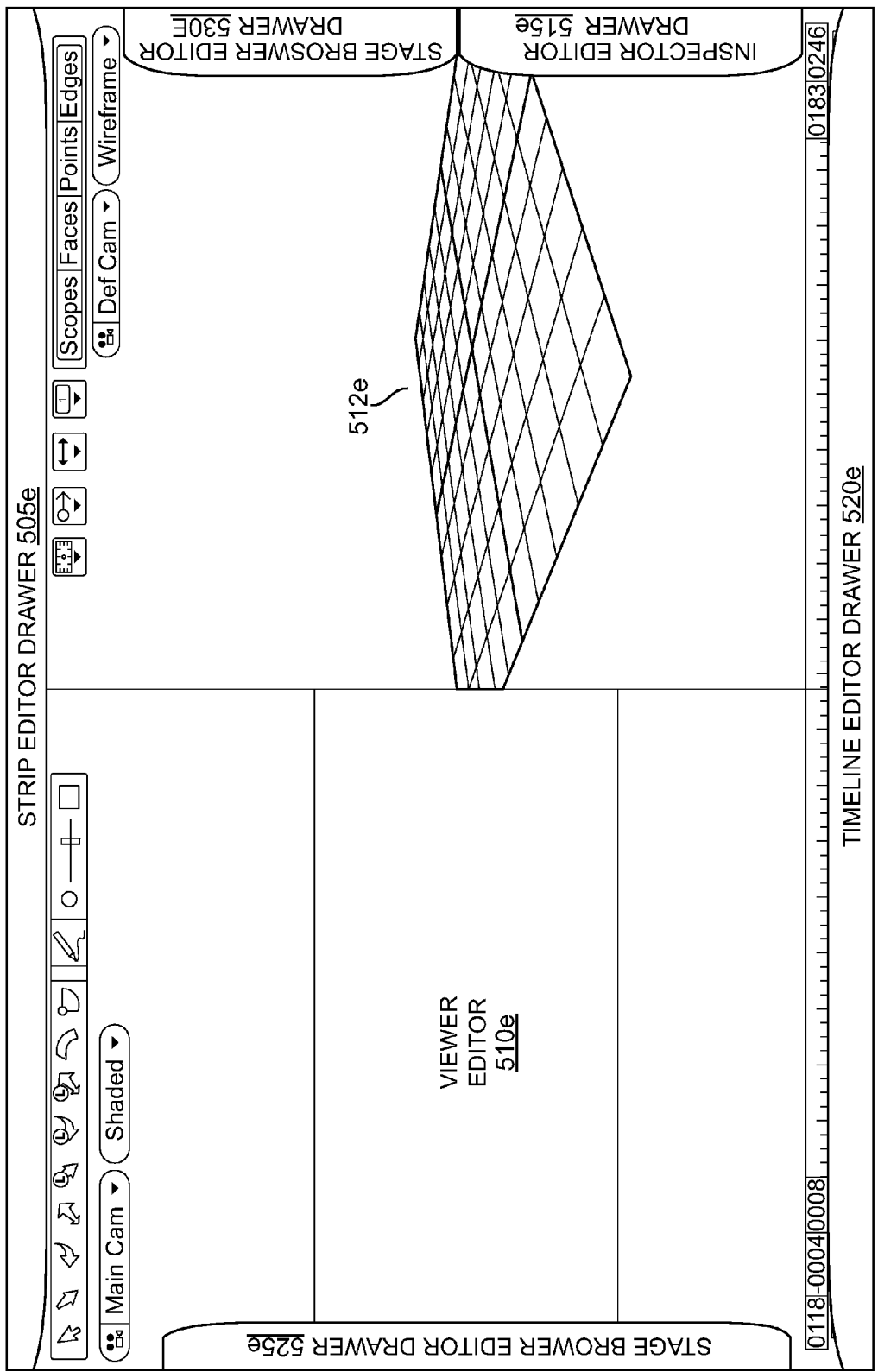

The placement template 517 include regions 517*a*, 517*b*, 517*c*, 517*d*, and 517*e*. The template region where the stage browser window is placed will determine where the stage browser editor drawer is placed. Each of these regions corresponds with a different potential arrangement of a stage browser editor drawer relative to the inspector editor drawer 515*d*. For example, by moving the cursor to placement temple region 517*c* when moving the stage browser window 530*d*, the stage browser editor drawer will be placed above the inspector editor drawer on the right edge of the application display area, as shown in FIG. 5*e*. In another example, by moving the cursor to placement temple region 517*d* when moving the stage browser window 530*d*, the stage browser editor drawer will be placed below the inspector editor drawer.

FIG. 5E illustrates an example full-screen mode 500*e* showing the arrangement of multiple secondary editor drawers on an edge of the application display area. In example full-screen mode 500*e*, a stage browser editor drawer 530*e*, corresponding with the stage browser editor window 530*d* from the previous example, is located along the right edge of the application display area above the inspector editor drawer 515*e*. In this example 500*e*, the height of an editor drawer in its open configuration may be different than its height in the closed configuration. For example, the stage browser editor drawer 530*e* may extend the full height of the application display area in its open configuration and half of the height of the application display area in its closed configuration. For secondary editor drawers located along the top and bottom edges of the application display area, the width of the editor drawers may vary between their open and closed configuration.

Figure 5F:
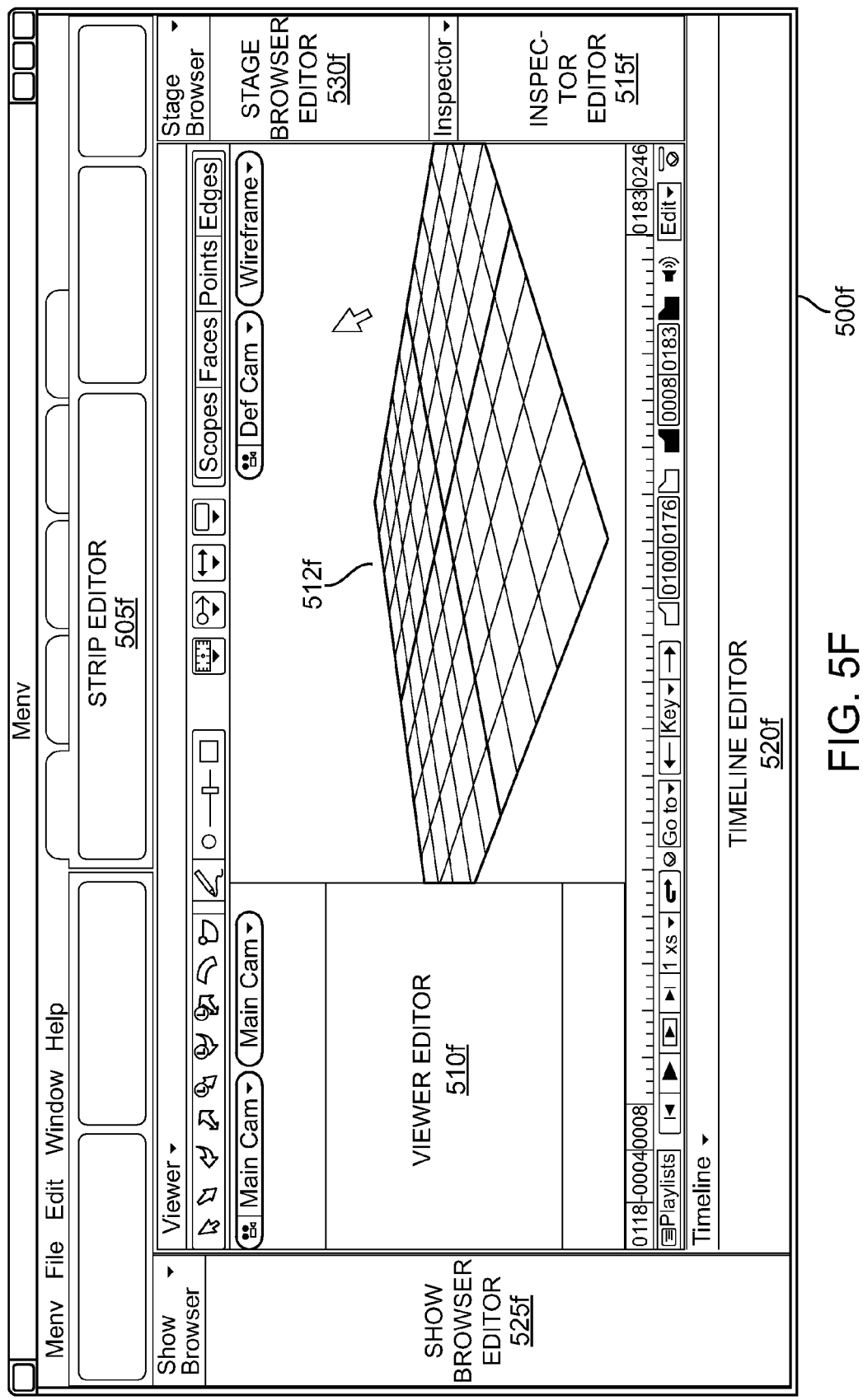

Examples 500*a*-500*e* in FIGS. 5A-5E illustrate the customization of the application user interface in full-screen mode. In an embodiment, these customizations are maintained when switching back to the windowed mode of the application user interface. FIG. 5F illustrate an example windowed mode 500*f* of an application user interface according to an embodiment of the invention.

In this example, the types and arrangements of editor windows in windowed mode 500*f* corresponds with that shown in full-screen mode 500*e*. Windowed mode 500*f* includes a strip editor window 505*f*, a viewer editor window 510*f*, an inspector editor window 515*f*, and a timeline editor window 520*f*. Additionally, windowed mode 500*f* includes the show browser editor window 525*f* and the stage browser editor window 530*f*. In an embodiment, the application user interface may resize the strip editor window 505*f*, the viewer editor window 510*f*, the inspector editor window 515*f*, the timeline editor window 520*f*, the show browser editor window 525*f*, and/or the stage browser editor window 530*f* so that all of these editors are visible in the application display area. For example, the strip editor window 505*f*, the viewer editor window 510*f*, the inspector editor window 515*f*, and the timeline editor window 520*f* in windowed mode 500*f* are smaller than their counterparts in windowed mode 100 due to the addition of the show browser window 525*f* and stage browser window 530*f*.

As discussed above, the relative positions of the editor windows 505*f*-530*f* in the windowed mode 500*f* corresponds with the relative positions of the editor drawers 505*e*-530*e* in the full-screen mode 500*e*. For example, the stage browser editor window 530*f* is located above the inspector editor window 515*f* on the right side of the application display area in windowed mode 500*f*, similar to the arrangement of the stage browser editor drawer 530*e* and the inspector editor drawer 515*e* as shown in the example full-screen mode 500*e*.

As discussed above, users can switch from windowed mode to full-screen mode of an application user interface to focus on a single primary editor. The primary editor in full-screen mode is determined by the currently active editor or editor window in the windowed mode. In an additional embodiment, users can change the primary editor in full-screen mode without having to switch back to the windowed mode to activate a different editor.

Figure 6A:
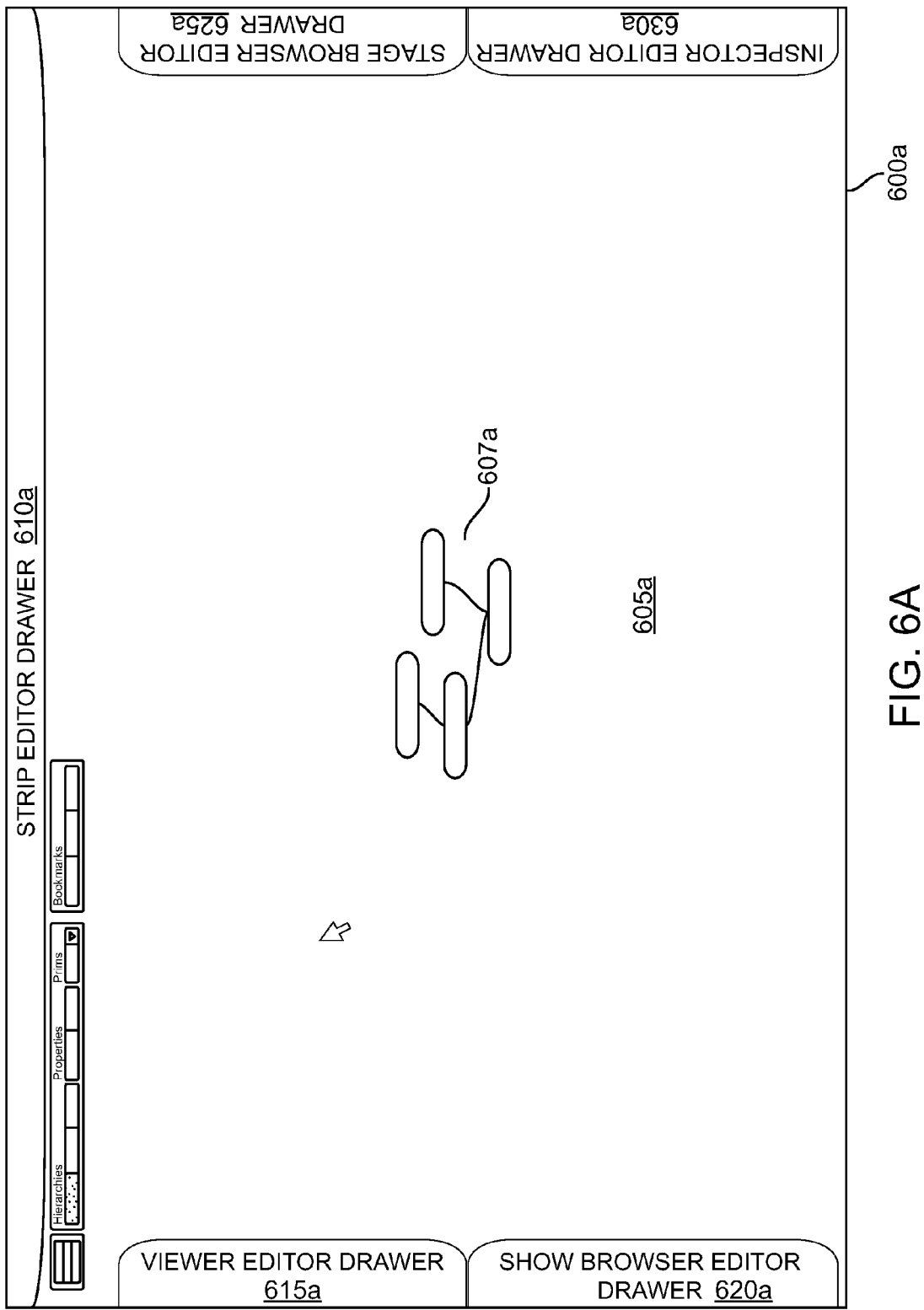
FIGS. 6A-6C illustrate an example of changing tasks in a full-screen mode of an application user interface according to an embodiment of the invention.
Figure 6B:
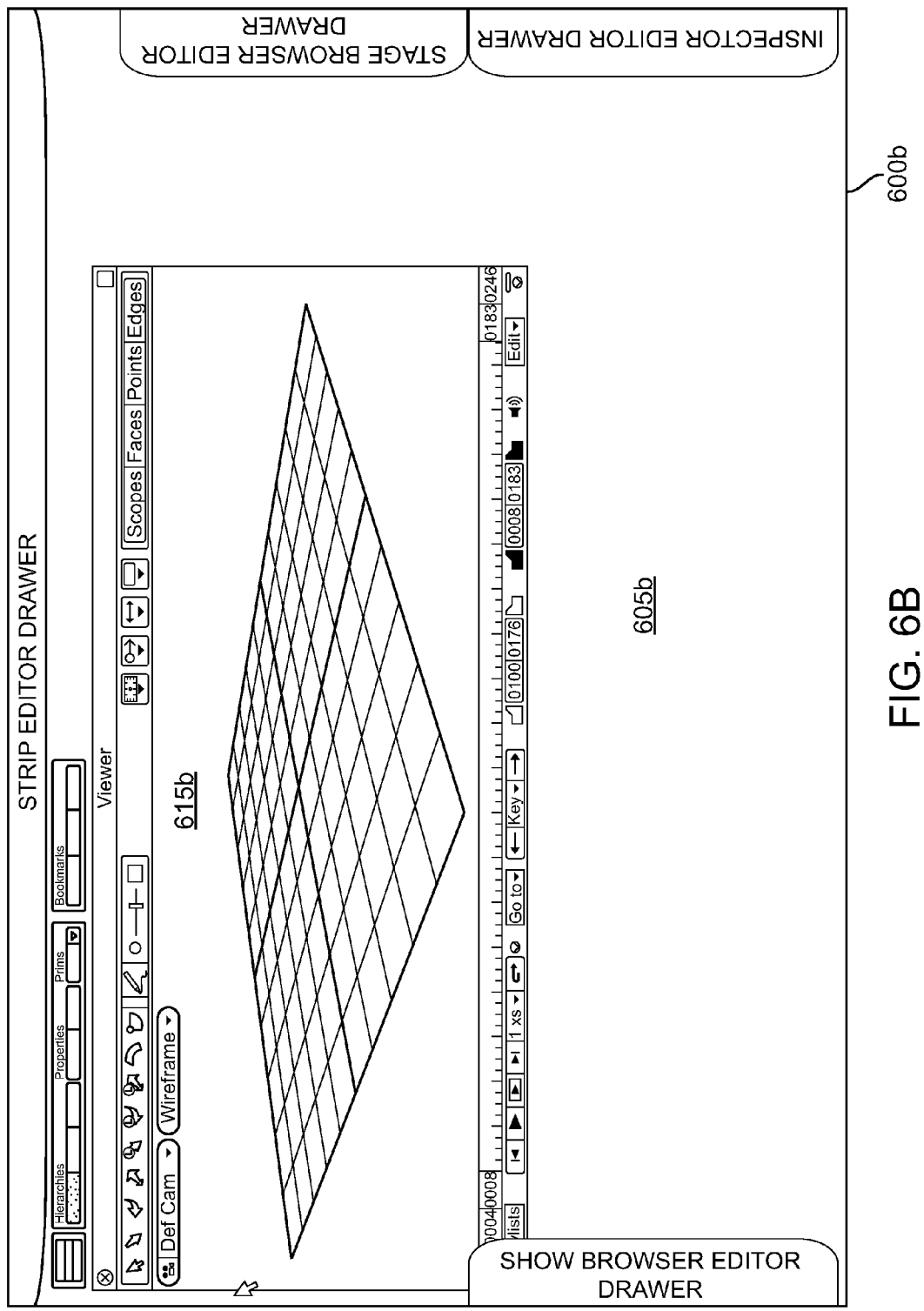
Figure 6C:
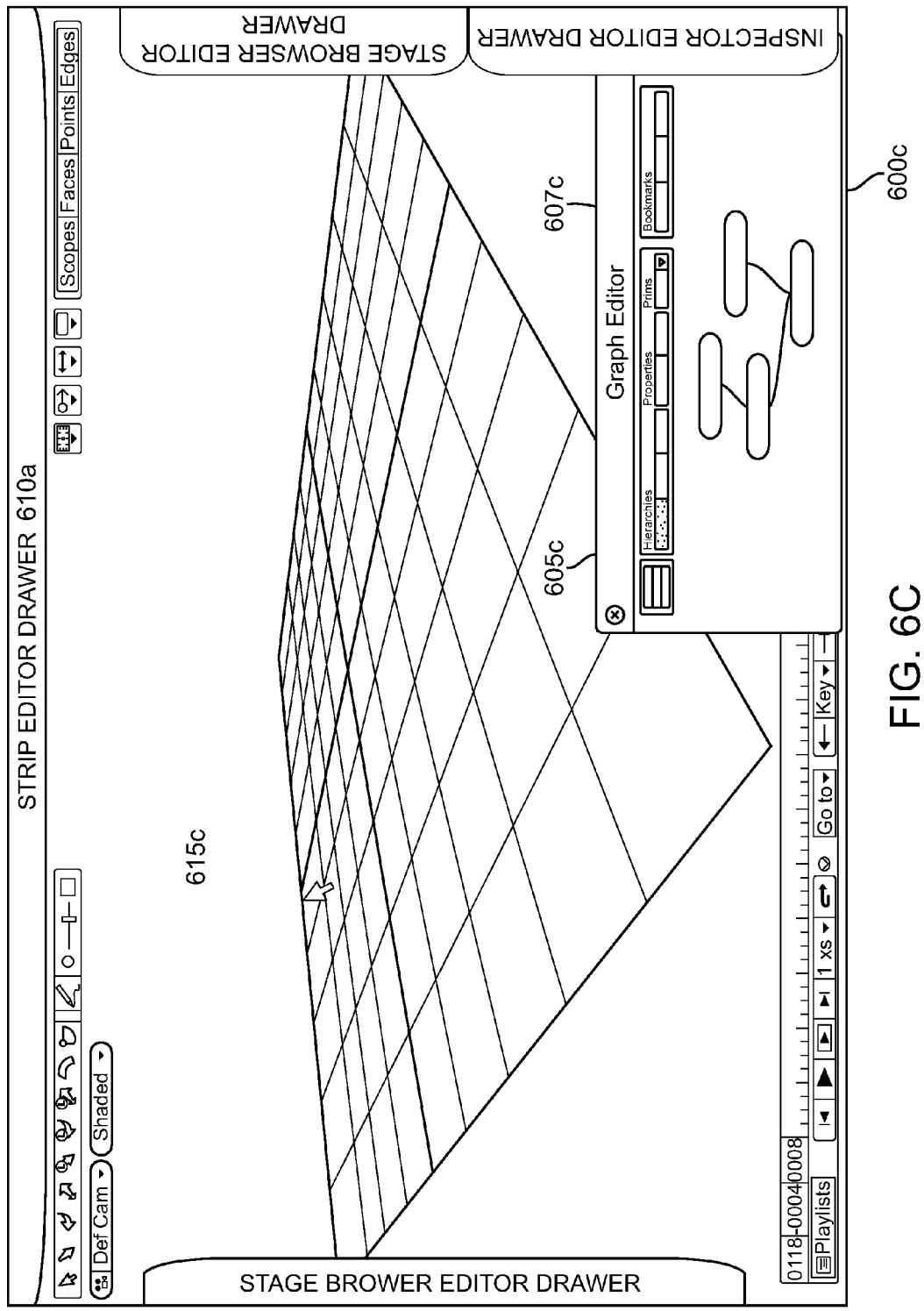

FIGS. 6A-6C illustrate an example of changing tasks in a full-screen mode of an application user interface according to an embodiment of the invention. FIG. 6A illustrates a first example full-screen mode 600*a* of an application user interface. Example full-screen mode 600*a* includes a graph editor 605*a* selected as the primary editor. The graph editor 605*a* includes a data view 607 of a graph of related data objects. Example full-screen mode also includes secondary editor drawers for secondary editors, such as strip editor drawer 610*a*, viewer editor drawer 615*a*, stage browser editor 620*a*, stage browser drawer 625*a*, and inspector editor drawer 630*a*.

FIG. 6B illustrates the activation of a secondary editor drawer in an example full-screen mode 600*b* of an application user interface. As described above, a user can activate the viewer editor drawer 615*b* and changing this secondary editor drawer to its open configuration by moving the cursor over the viewer editor drawer 615*b*.

In an embodiment, once a secondary editor drawer such as the viewer editor drawer 615*b* is in its open configuration, a further user input can be used to select this secondary editor as the primary editor. The user input can be one or more keyboard commands, mouse or cursor inputs, or other types of user inputs. In response to this user input, the application user interface will change the active secondary editor into the primary editor displayed in the full-screen mode. The application user interface will also change the previous primary editor, such as the graph editor 705*b* in example full-screen mode 700*b*, into a secondary editor drawer.

FIG. 6C illustrates the change in primary editors in an example full-screen mode 600*c* according to an embodiment of the invention. In example full-screen mode 600*c*, the presentation of the viewer editor has been changed from a secondary editor drawer 615*b* as shown in FIG. 6B to a primary editor 615*c* as shown in FIG. 6C. Additionally, the presentation of the graph editor has been changed from a primary editor 605*b* as shown in FIG. 6B to a graph editor drawer 605*c*.

As shown in FIG. 6C, an embodiment of the application user interface positions the graph editor drawer 605*c* is a similar position relative to the primary viewer editor 615*c* in the full-screen mode 600*c* as the primary graph editor 605*b* is to the viewer editor drawer 615*b* in full-screen mode 600*b*. In this example, the viewer editor drawer 615*b* is to the left of the primary graph editor 605*b* is to in full-screen mode 600*b*. Thus, the viewer editor 615*c* is located to the left of the graph editor drawer 605*c* in full-screen mode 600*c*.

In a further embodiment, the application user interface initially presents the newly created graph editor drawer 605*c* in its open configuration to provide a visual cue to user of the new location of the graph editor. After a short period of time, the graph editor drawer 605*c* automatically returns to its closed position unless activated by user input. In still further embodiments, additional visual effects, such as color and transparency effects, and animation, such as editors moving and resizing, can provide additional visual cues about the layout and function of the editors when changing full-screen modes.

In further embodiments, the application user interface can be implemented over multiple display devices. In one implementation, two or more display devices act as a unified application display area. In another implementation, each display device may be assigned different types of application or display modes. For example, a first display device may be set to default to a full-screen mode, while a second display device may be set to default to a windowed mode, as describe above. In still a further implementation, the edges of each display device may be used for placing drawer user interface elements. In a modification of this implementation, drawer user interface elements may be excluded from an edge of one display device if that edge is adjacent to an edge of another display device. This allows users to smoothly move a cursor between display devices without inadvertently opening drawers. Alternatively, drawer user interface elements may be allowed on these adjacent edges, with an additional commands or actions, such as a hot key, mouse click, or time delay, required to activate or open these drawer user interface elements.

Embodiments of the invention may be implemented within a single application including multiple editors, across multiple applications working cooperatively, within a window manager or windowing system, or built into a graphical user interface of an operating system.

Figure 7:
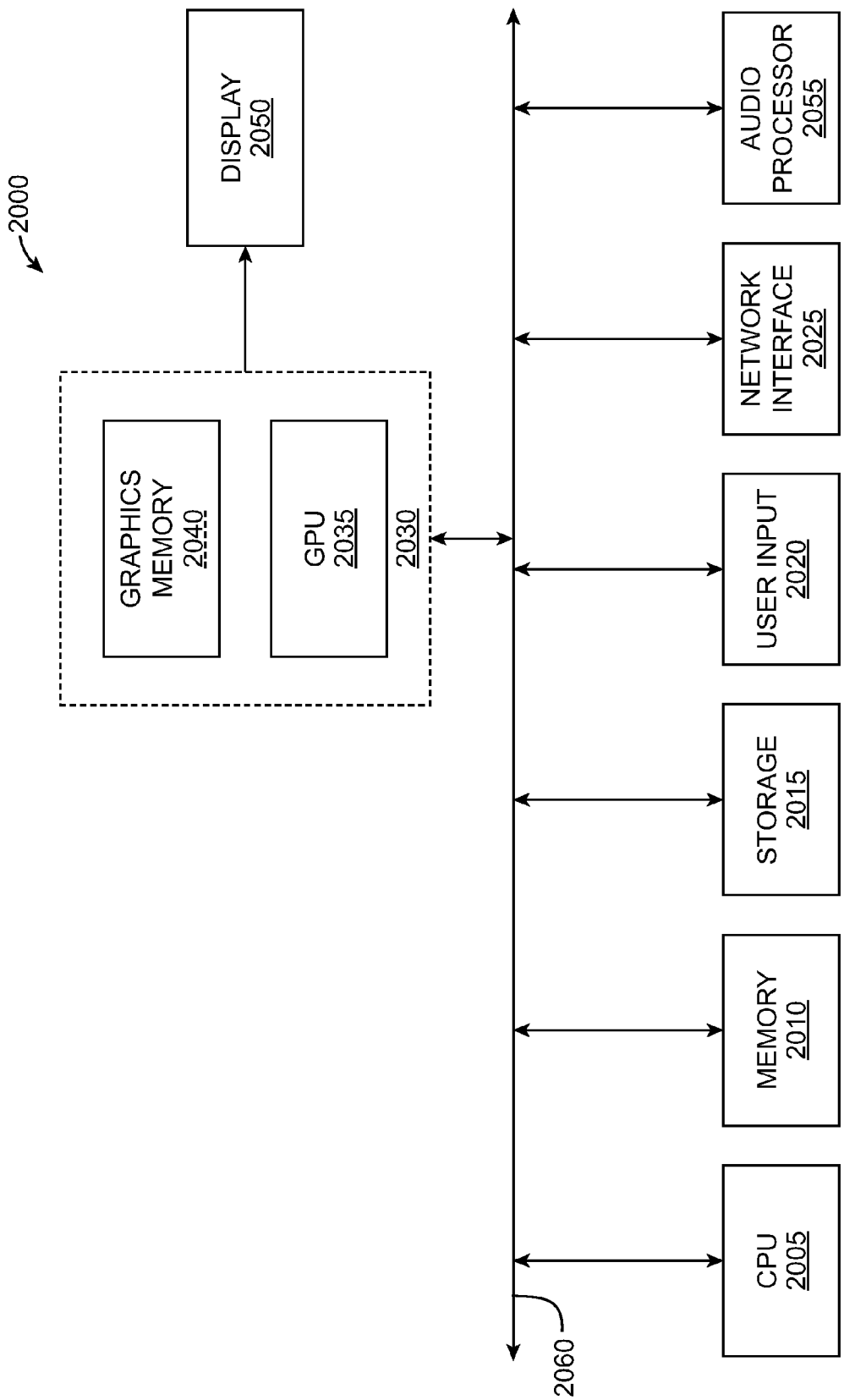
FIG. 7 illustrates an example computer system suitable for implementing an embodiment of the invention.

FIG. 7 illustrates an example computer system 2000 suitable for implementing an embodiment of the invention. FIG. 7 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of presenting multiple editors on at least one display device, the method comprising:
    displaying a first display mode including a first arrangement of a second editor with respect to a first editor in an application display area, wherein the first arrangement includes a first data view and a first control set of the first editor and a second data view and a second control set of the second editor;
    receiving a first command to change from the first display mode to a second display mode; and
    in response to the first command, displaying the second display mode, wherein displaying the second display mode comprises:
        enlarging the first editor in the application display area; and
        reducing the second editor to a user interface element located on a set of edges of the application display area, wherein the user interface element includes a closed configuration wherein the second data view and the second control set are not visible;
    wherein the second display mode includes a second arrangement of the user interface element with respect to the enlarged first editor;
    wherein the first display mode presents the second editor as a background element at least partially covered by the first editor contained in an additional user interface element located on the set of edges of the application display area; and
    wherein the second display mode presents the first editor as a background element at least partially covered by the second editor.

2. The method of claim 1, wherein the user interface element includes a drawer user interface element.

3. The method of claim 1, further comprising:
    receiving a second command to display the second editor; and
    in response to the second command, changing the user interface element to an open configuration displaying the second data view and the second control set, wherein the user interface element in the open configuration overlaps at least a portion of the enlarged first editor in the application display area.

4. The method of claim 3, wherein the second command includes moving a cursor over the user interface element in the closed configuration.

5. The method of claim 3, further comprising:
    receiving a third command to display the first editor;
    in response to the third command, changing the user interface element to the closed configuration wherein the second data view and the second control set are not visible.

6. The method of claim 5, wherein the third command includes moving the cursor outside of the user interface element.

7. The method of claim 1, further comprising:
    receiving a second command to display the second editor; and
    in response to the second command:
        reducing the enlarged first editor to a second user interface element located on the set of edges of the application display area, wherein the second user interface element includes a closed configuration wherein the first data view and the first control set are not visible; and
        enlarging the user interface element so that a portion of the application display area previously displaying the enlarged first editor displays an enlarged second editor including the second data view and second control set.

8. The method of claim 1, wherein the application display area is associated with a plurality of display devices.

9. The method of claim 1, further comprising:
    receiving a second command to initialize a third editor;
    in response to the second command, initializing a third editor including a third data view and a third control set; and
    creating a second user interface element located on the set of edges of the application display area, wherein the second user interface element includes a closed configuration wherein the third data view and the third control set are not visible and an open configuration displaying the third data view and the third control set overlapping at least a portion of the enlarged first editor in the application display area.

10. The method of claim 9, further comprising:
    receiving a third command to change from the second display mode to a modified first display mode; and
    in response to the third command, simultaneously displaying the first editor including the first data view and the first control set, the second editor including the second data view and second control set, and the third editor including the third data view and the third control set in the application display area, wherein each of the first editor, the second editor, and third editor is displayed in a separate portion of the application display area.

11. The method of claim 10, wherein a third arrangement comprises the arrangement of the enlarged first editor, the user interface element, and the second user interface element with respect to each other in the second display mode; and
    wherein the modified first display mode includes a fourth arrangement of the first editor, the second editor, and the third editor, wherein the fourth arrangement corresponds with the third arrangement.

12. The method of claim 9, wherein creating the second user interface element includes:
    displaying the third editor in a window;
    receiving a third command selecting one of the set of edges of the application display area; and
    reducing the window to the second user interface element located on the selected one of the set of edges of the application display area.

13. The method of claim 12, wherein the third command includes moving the window to one of the set of edges of the application display area.

14. The method of claim 1, wherein the first command is received via an input device selected from a group consisting of:
    a keyboard; a mouse; a joystick; a digitizer tablet; a touch screen; a touch pad; a microphone; a motion sensor; and a still or video camera.

15. A method of presenting multiple editors on at least one display device, the method comprising:
    initializing a first editor including a first data view and a first control set;
    initializing a second editor including a second data view and a second control set;
    displaying the first editor including the first data view and the first control set in an application display area;
    displaying a first user interface element representing the second editor, wherein the first user interface element is located on a set of edges of the application display area and includes a closed configuration wherein the second data view and the second control set are not visible and an open configuration displaying the second view and the second control set overlapping at least a portion of the first editor in the application display area;

receiving a first command to display the second editor; and in response to the first command:

reducing the first editor to a second user interface element located on the set of edges of the application display area, wherein the second user interface element includes a closed configuration wherein the first data view and the first control set are not visible; and enlarging the first user interface element so that a portion of the application display area previously displaying the first editor displays an enlarged second editor including the second data view and second control set;

wherein the second user interface element includes an open configuration displaying the first data view and the first control set overlapping at least a portion of the enlarged second editor in the application display area;

wherein prior to the receiving of the first command, the first editor is displayed as a background element at least partially covered by the second editor when the first user interface element is in an open configuration; and wherein following the receiving of the first command, the second editor is displayed as a background element at least partially covered by the first editor when the first user interface element is in an open configuration.

16. The method of claim 15, wherein the user interface element includes a drawer user interface element.

17. The method of claim 15, wherein the application display area is associated with a plurality of display devices.

18. The method of claim 15, further comprising:

receiving a second command to initialize a third editor;

in response to the second command, initializing a third editor including a third data view and a third control set;

creating a third user interface element representing the third editor, wherein the third user interface element is located on the set of edges of the application display area and includes a closed configuration includes a closed configuration wherein the third data view and the third control set are not visible and an open configuration displaying the third data view and the third control set overlapping at least a portion of the enlarged second editor in the application display area; and displaying the third user interface element in the closed configuration.

19. The method of claim 18, further comprising:

receiving a third command to display the third editor; and in response to the third command:

reducing the enlarged second editor to the first user interface element located on the set of edges of the application display area, wherein the first user interface element includes a closed configuration includes a closed configuration wherein the second data view and the second control set are not visible; and enlarging the third user interface element so that a portion of the application display area previously displaying the enlarged second editor displays an enlarged third editor including the third data view and third control set.

20. The method of claim 15, wherein a first arrangement comprises the arrangement of the first editor with respect to the first user interface element; and wherein a second arrangement comprises the arrangement of the second user interface element with respect to the enlarged second editor;

wherein the first arrangement corresponds with the second arrangement.

21. The method of claim 15, wherein the first command is received via an input device selected from a group consisting of:

a keyboard; a mouse; a joystick; a digitizer tablet; a touch screen; a touch pad; a microphone; a motion sensor; and a still or video camera.

22. A computer-readable storage medium including instructions adapted to direct a computer to perform an operation, the operation comprising:

displaying a first display mode including a first arrangement of a second editor with respect to a first editor in an application display area, wherein the first arrangement includes a first data view and a first control set of the first editor and a second data view and a second control set of the second editor;

receiving a first command to change from the first display mode to a second display mode; and in response to the first command, displaying the second display mode, wherein displaying the second display mode comprises:

enlarging the first editor in the application display area; and reducing the second editor to a user interface element located on a set of edges of the application display area, wherein the user interface element includes a closed configuration wherein the second data view and the second control set are not visible;

wherein the second display mode includes a second arrangement of the user interface element with respect to the enlarged first editor;

wherein the first display mode presents the second editor as a background element at least partially covered by the first editor contained in an additional user interface element located on the set of edges of the application display area; and wherein the second display mode presents the first editor as a background element at least partially covered by the second editor.

23. The computer readable storage medium of claim 22, further comprising:

receiving a second command to display the second editor; and in response to the second command, changing the user interface element to an open configuration displaying the second data view and the second control set, wherein the user interface element in the open configuration overlaps at least a portion of the enlarged first editor in the application display area.

24. The computer readable storage medium of claim 22, further comprising:

receiving a second command to display the second editor; and in response to the second command:

reducing the enlarged first editor to a second user interface element located on the set of edges of the application display area, wherein the second user interface element includes a closed configuration wherein the first data view and the first control set are not visible; and enlarging the user interface element so that a portion of the application display area previously displaying the enlarged first editor displays an enlarged second editor including the second data view and second control set.

25. The computer readable storage medium of claim 22, further comprising:

receiving a second command to initialize a third editor;

in response to the second command, initializing a third editor including a third data view and a third control set; and creating a second user interface element located on the set of edges of the application display area, wherein the second user interface element includes a closed configuration wherein the third data view and the third control set are not visible and an open configuration displaying the third data view and the third control set overlapping at least a portion of the enlarged first editor in the application display area.

26. The computer readable storage medium of claim 25, further comprising:

receiving a third command to change from the second display mode to a modified first display mode; and in response to the third command, simultaneously displaying the first editor including the first data view and the first control set, the second editor including the second data view and second control set, and the third editor including the third data view and the third control set in the application display area, wherein each of the first editor, the second editor, and third editor is displayed in a separate portion of the application display area.

27. The computer readable storage medium of claim 26, wherein a third arrangement comprises the arrangement of the enlarged first editor, the user interface element, and the second user interface element with respect to each other in the second display mode; and wherein the modified first display mode includes a fourth arrangement of the first editor, the second editor, and the third editor, wherein the fourth arrangement corresponds with the third arrangement.

\* \* \* \* \*